July 28, 1942.  W. H. LEHMBERG  2,290,885
RESPIRATOR AND METHOD OF MAKING THE SAME
Filed April 5, 1940  4 Sheets-Sheet 1
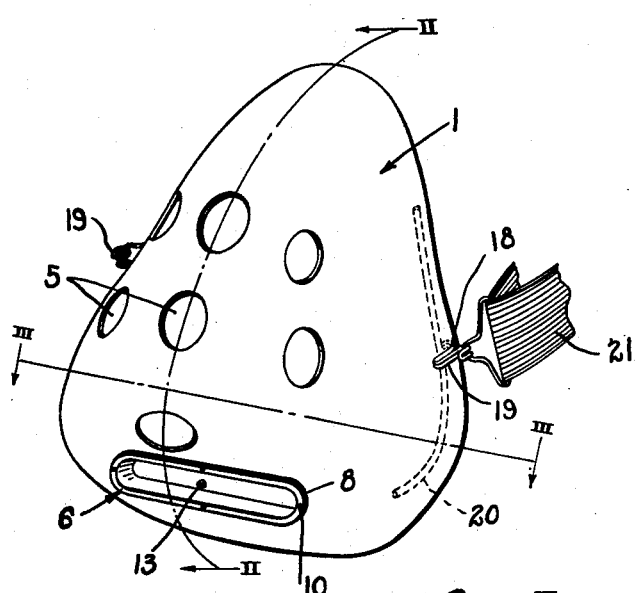
Fig. I
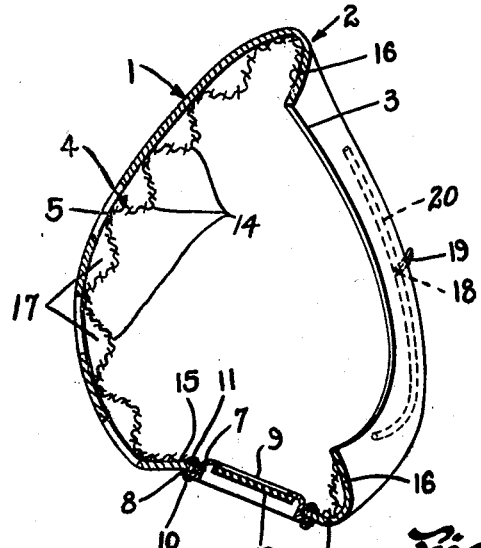
Fig. II
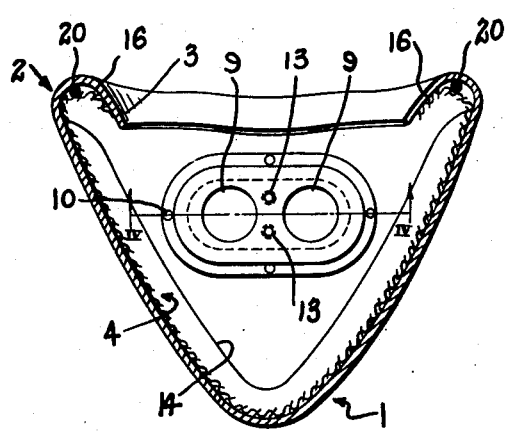
Fig. III
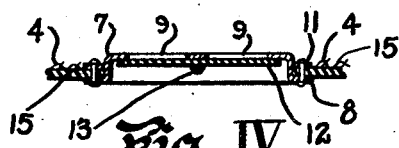
Fig. IV
INVENTOR
WILLIAM H. LEHMBERG
BY
Harry H. Styll.
ATTORNEY July 28, 1942. W. H. LEHMBERG 2,290,885
RESPIRATOR AND METHOD OF MAKING THE SAME
Filed April 5, 1940 4 Sheets-Sheet 2
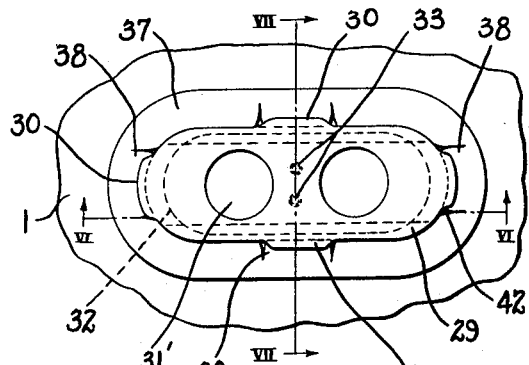
Fig. V
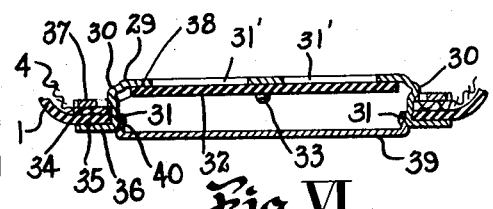
Fig. VI
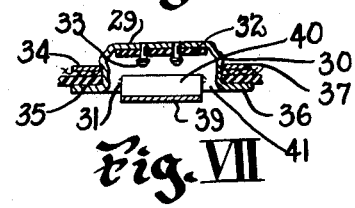
Fig. VII
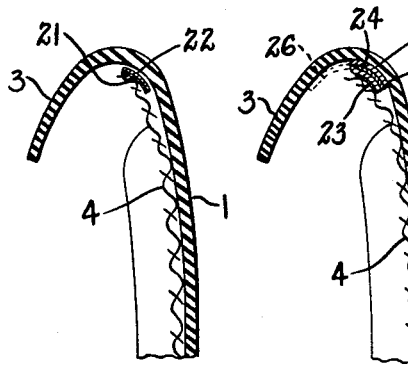
Fig. VIII Fig. IX
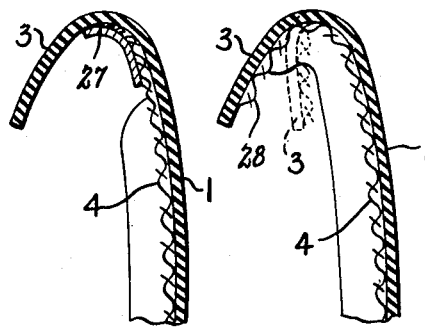
Fig. X Fig. XI
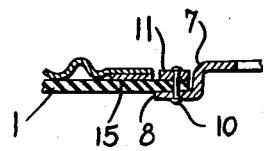
Fig. XII
INVENTOR.
WILLIAM H. LEHMBERG
BY Harry H. Styll
ATTORNEY.

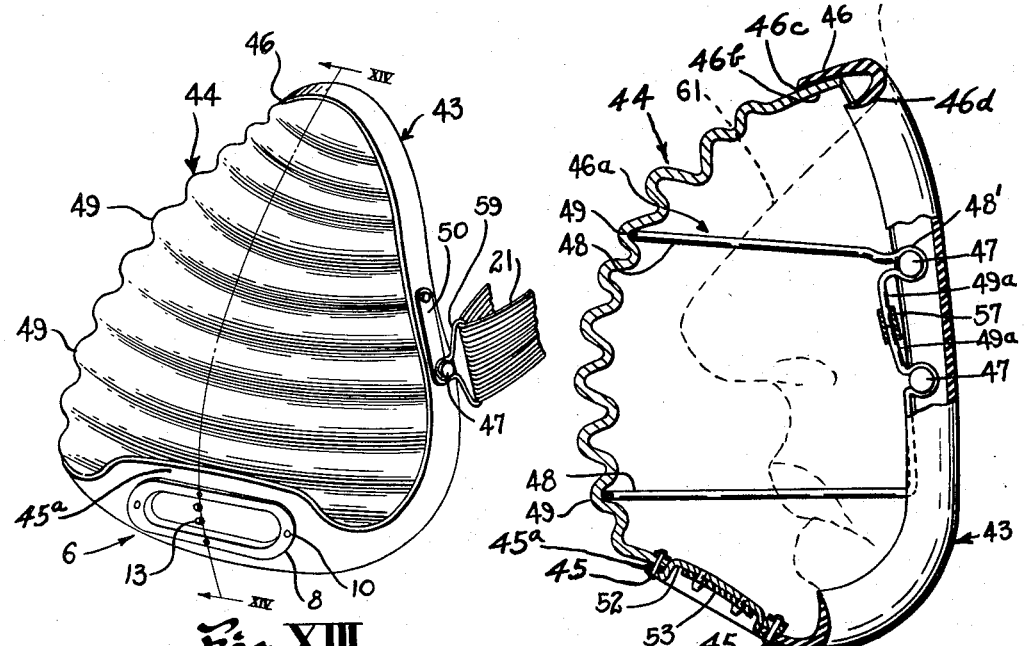
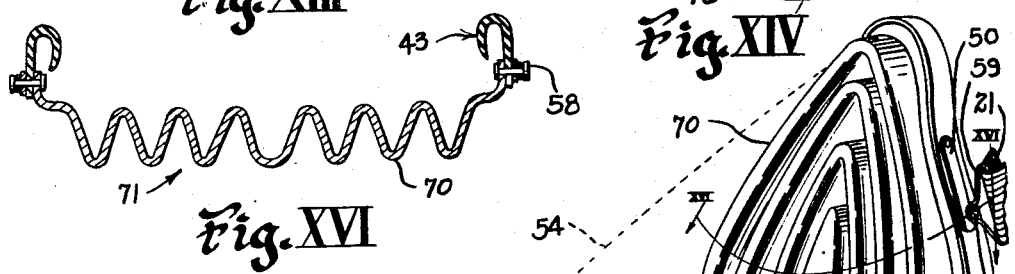
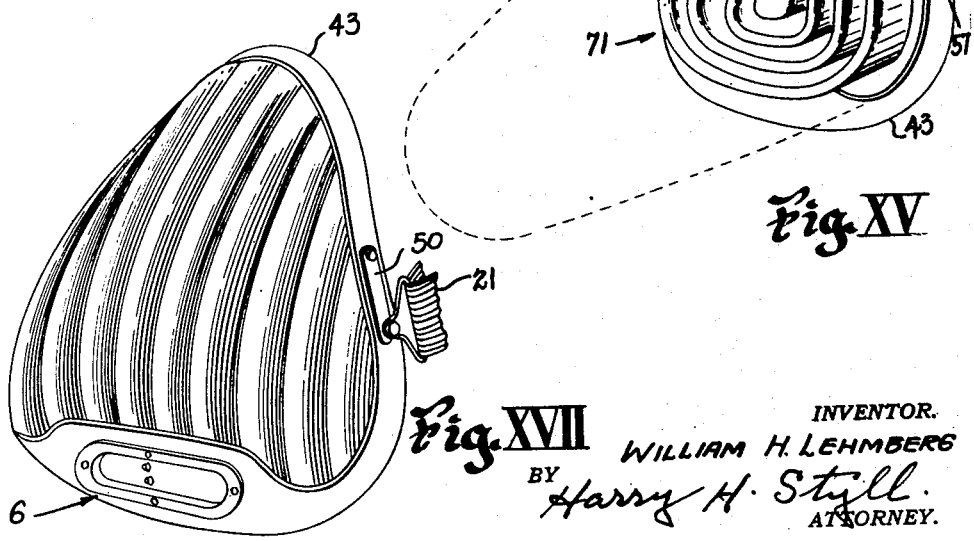

July 28, 1942.   W. H. LEHMBERG   2,290,885
RESPIRATOR AND METHOD OF MAKING THE SAME
Filed April 5, 1940   4 Sheets-Sheet 4
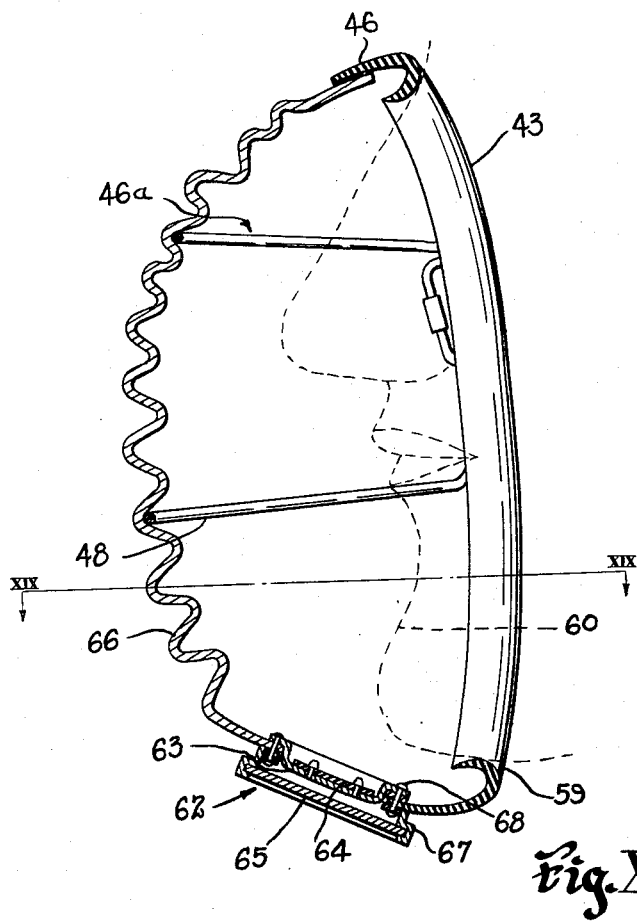
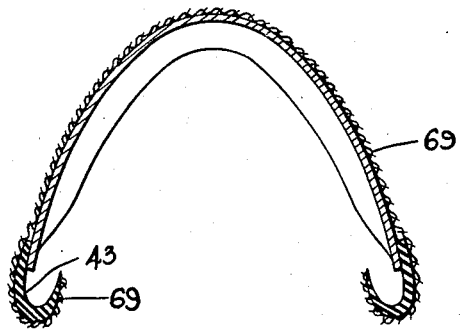
INVENTOR.
WILLIAM H. LEHMBERG
BY Harry H. Styll
ATTORNEY.

Patented July 28, 1942

2,290,885

UNITED STATES PATENT OFFICE 2,290,885

RESPIRATOR AND METHOD OF MAKING THE SAME

William H. Lehmberg, Dudley, Mass., assignor to American Optical Company, Southbridge, Mass., a voluntary association of Massachusetts Application April 5, 1940, Serial No. 328,073

6 Claims. (Cl. 128—146)

This invention relates to improvement in respirators and has particular reference to a novel construction and method of making the same.

This application is a continuation in part of my co-pending application Serial Number 180,812, filed December 20, 1937.

One of the principal objects of the invention is to provide a simple, comfortable and efficient respirator for general use as protective means for individuals exposed to relatively non-injurious dust particles, etc., and has particular reference to a novel and inexpensive construction and method of making the same.

Another object of the invention is to provide a housing support having an integral portion shaped to fit the contour of the face about the nose and mouth of the wearer and having characteristics which will permit the enclosing of filter means by deformation of the housing and integral face engaging portions which enable the filter means to be positioned within the housing and be held therein by the said housing and face engaging portion returning to their initial set.

Another object is to provide a respirator of the type set forth having a portion shaped to fit the contour of the face so as to surround the nose and mouth of the wearer and having new and improved filter means and method of securing the same in position and whereby it is held therein.

Another object is to provide a new and improved filter means for a respirator.

Another object is to provide a new and improved means for supporting the filter means of a respirator and whereby the same may be adjusted to fit the face and which will retain said adjusted position.

Another object is to provide interchangeable filter means for a respirator of the above character which may be supported in a relatively confined space and yet provide a relatively large filter area.

Another object is to provide novel means and method of forming an exhalation valve for a respirator having the above characteristics.

Another object is to provide novel means and method of supporting and sealing the filter means within a housing support.

Another object is to provide a relatively simple and inexpensive shield type of respirator and method of making the same.

Other objects and advantages of the invention should become apparent from the following descriptions taken in connection with the accompanying drawings. It is apparent that many changes may be made in the details of construction, arrangement of parts and method shown and described without departing from the spirit of the invention as expressed in the accompanying claims. I, therefore, do not wish to be limited to the exact details of construction, arrangement of parts and method shown and described as the preferred forms only are given by way of illustration.

Referring to the drawings:

Fig. I is a perspective view of one device embodying the invention;

Fig. II is a sectional view taken as on line II—II of Fig. I;

Fig. III is a sectional view taken as on line III—III of Fig. I;

Fig. IV is a fragmentary sectional view taken as on line IV—IV of Fig. III;

Fig. V is a plan view of a modified form of an exhalation valve;

Fig. VI is a longitudinal sectional view taken as on line VI—VI of Fig. V;

Fig. VII is a transverse sectional view taken as on line VII—VII of Fig. V;

Fig. VIII is a fragmentary enlarged sectional view illustrating a modified form of means for shielding the peripheral or free edges of the filter means in the respirator;

Figs. IX, X and XI show further modifications of means for shielding the filter means in the respirator housing;

Fig. XII is a fragmentary sectional view illustrating a modified arrangement for shielding the filter means about the exhalation valve.

Fig. XIII is a perspective view illustrating a modified form of respirator embodying the invention;

Fig. XIV is a sectional view taken on line XIV—XIV of Fig. XIII;

Fig. XV is a perspective view illustrating a further modified form of respirator embodying the invention;

Fig. XVI is a sectional view taken on line XVI—XVI of Fig. XV;

Fig. XVII is a view similar to that of Fig. XIII, showing a modification;

Fig. XVIII is a view similar to that of Fig. XIV, showing a modification; and

Fig. XIX is a sectional view such as would be shown if taken on line XIX—XIX of Fig. XVIII, except that the entire respirator is covered by a stockinet member.

Respirators for protecting individuals exposed to physiologically inert particulate matter dispersed in a gaseous medium such as smoke, dust, etc. are not new in the art. Such devices however, in most instances in the past, were of such a character that they obstructed the vision of the wearer, were heavy, cumbersome, inefficient and uncomfortable to wear and were in general a hindrance to the wearer. In many instances in the past, when attempts were made to reduce the size, to decrease the weight and increase field of vision the filter means was reduced in size and in order to obtain the desired degree of filtering hindered respiration. In many instances such devices were complicated and costly in construction and in other instances were of such a nature that when the filter means became so impregnated with dust particles and so forth, as to render the said filter means impractical for further use, the said respirator had to be discarded or sent to the factory for filter replacement.

The filter medium of such devices, because of their inherent small dimension, frequently required replacing or cleansing because of relatively rapid plugging or saturation by moisture.

Therefore, it is one of the primary objects of this invention to provide a simple, inexpensive and efficient respirator which will overcome all of the above disadvantages and which will be exceedingly light in weight and comfortable when in position of use and which will provide substantially normal respiration and a relatively unobstructed field of vision.

Referring more particularly to the drawings wherein like characters of reference designate like parts throughout the several views the device embodying the invention comprises broadly a housing or face piece 1 which is preferably formed of a material such as latex or rubber which may be formed to a given shape and which may be deformed from said shape and when released return to its initial set or shape. The housing or face piece 1 is provided with a face engaging edge portion 2 which is adapted to fit about the nose and mouth of the wearer and which is provided with an inturned integral lip 3 which has a substantial surface cushion contact with the face of the wearer and which is self-adjusting to variations in the facial contour of different individuals. The inturned lip also functions as means for retaining the filter means 4 internally of the housing or face piece 1. The housing or face piece 1 is provided with a plurality of openings 5 through which air is drawn into the face piece during respiration. Adjacent the bottom of the face piece 1 there is provided an exhalation valve 6. This valve as shown in Figs. I to IV, inclusive, comprises a cupped member 7 having a flanged edge 8 and openings 9 therein through which the air may be expelled from the interior of the face piece during respiration. The cupped portion 7 extends within an opening having a contour shape similar to the contour shape of said cupped portion and is secured in said opening by rivets or like means 10 which extend through the flange 8, material of the face piece 1 adjacent the cupped portion and a suitable clamp ring 11 which is adapted to be drawn into clamped relation with the portion of the face piece surrounding the cupped portion 7 by heading over and reducing the lengths of the rivets 10.

Air is prevented from entering the openings 9 during inhalation by means of a resilient flap 12 of rubber, latex or other suitable material which is held in superimposed relation with the openings 9 by headed pin members 13. The flap 12 is formed with spaced openings of smaller diameters than the heads of the pins 13 and is adapted to be snapped over said pin members and held in superimposed relation with the openings 9 within the cupped portion of the member 7. It is apparent that this member 12 may be quickly and easily interchanged if desired.

The filter means 4, in this particular instance, is formed of felt, foraminous or other suitable material which is shaped to the general inner contour shape of the face piece or housing 1. The said filter has its main effective portion provided with a sinuous contour forming substantially parallel corrugations 14 extending substantially transversely thereof and has an opening in its lower portion through which the cup like member 7 extends, as shown in Fig. II. Its edge surrounding the member 7 is, in this instance, secured to the adjacent wall of the face piece or housing 1, as illustrated at 15, by a suitable cement or adhesive. The peripheral edge of the filter means 4 is, in this particular instance, secured to the inner surface of the lip 3, as illustrated at 16, by means of a suitable cement or adhesive. This provides a positive seal throughout the peripheral edge of the filter means and throughout the portion of said filter means surrounding the cup member 7.

The plurality of corrugations 14 greatly increase the filtering area of the filter means 4 in the relatively confined inner space of the housing or face piece 1 and also provide means for holding the said filter in spaced relation with the front wall of the housing or face piece as illustrated at 17.

The housing or face piece 1 is provided with openings 18 on the opposite sides thereof through which suitable hooks or clips 19, carried by brace rods 20 internally of the face piece are extended. The said hooks or clips 19 provide means to which a suitable head band 21 may be connected to hold the housing or face piece 1 on the face of the wearer.

The filter means 4, which has been specified above as being shaped substantially to the inner contour shape of the housing or face piece 1, is placed and held in said face piece by deforming the said face piece and integral lip 3 to such an extent as to permit insertion of the filter means 4 and by thereafter allowing the said face piece 1 and integral lip 3 to return to their initial set. The edge portions 15 and 16 of said filter means are then secured to the face piece 1 by cement or other suitable adhesive which may be either placed on the filter means prior to inserting it in the face piece or placed on the inner surface of the edge of the face piece prior to the insertion of the filter means therein. The adhesive may be placed between said filter means and the inner surface of the face piece 1 after the said face piece has been inserted therein if desired.

In Fig. XII there is shown an enlarged view which is believed to more clearly illustrate how the face piece is secured about the cupped shaped member 7 by cementing as illustrated at 15.

Figs. VIII to XI, inclusive, illustrate a plurality of different means and methods of securing the filter means 4 internally of the face piece or housing 1.

In Fig. VIII the peripheral edge portions of the filter means 4 which are to be secured to the face piece 1, as shown at 21, are provided with a layer of adhesive which has a layer of protective cloth-like material thereon similar to ordinary tire patches, which, when desired for use, can be pulled off of the adhesive face. The said filter means 4 is then placed within the face piece 1 and is secured therein by the adhesive layer 21.

In Fig. IX there is shown a further modification wherein the portion of the filter means 4 which is to be sealed with the face piece 1 has secured thereto by suitable cement or adhesive, as illustrated at 23, a strip of binding material 24 which is folded and which has a coating of adhesive 25 therein. When brought into use the portion 26 of the folded material 24, as illustrated in dotted lines, is pulled outwardly to expose the layer of adhesive 25 and to provide binding means for securing the filter to the face piece.

In Fig. X the portions of the filter means 4 which are to be secured to the face piece 1 are sealed to said face piece by binding means such as adhesive tape or the like 27.

In Fig. XI the peripheral edge of the filter means 4, as illustrated at 28, is provided with a lip similar to the lip 3 and is adapted to be sealed throughout said peripheral edge by the flexing characteristics of the lip 3 which is compressed when the face piece 1 is in secured relation with the face and thereby tends to pinch the peripheral edge of the filter 4 and seal the said edge in in the face piece.

In Figs. V to VII, inclusive, there is shown a modified form of exhalation valve. In this particular instance, the cup member 29 corresponding to the cup 7 is provided with integral projecting lips 30 extending in an outward direction and lips 31 extending in an inward direction. The cup member 29, similar to the cup member 7, is provided with spaced openings 31' having a flat or curved valve member 32 held in superimposed relation therewith by means of attaching pins 33.

In this particular instance the edge 34 of the filter means 4 and the edge 35 of the face piece 1 surrounding the cup member 29 are secured in superimposed relation with an integral flange 36 on the cup member 29 by means of a snap ring 37 having resilient portions 38 which are adapted to be snapped over the projecting lips 30 and pinch the material of the face piece 1 and filter means 4 between said lip 36 and ring 37. This provides a positive seal throughout the contour of the cup 29. A shield member 39 having inturned resilient portions 40 adjacent its opposite ends is supported and held over the open portion or mouth of the cup member 29 by snapping the said resilient portions 40 over the inwardly projecting lips 31. This plate 39 acts as a shield for the valve 32. The plate 39 is supported with its longitudinal edges spaced from the sides of the cup member 29, as illustrated at 41, to provide free exhalation. The lips 38, as illustrated in Fig. V, are preferably formed by slotting the ring 37 as illustrated at 42.

With the above construction of exhalation valve it is to be noted that the filter means 4 may be quickly and easily interchanged by removing the ring 37, placing a fresh filter member internally of the face piece 1 and in fitted relation about the cup shaped member 29 and the ring 37 thereafter snapped into position. This also provides a ready attachment of the exhalation valve to the face piece 1 wherein the said valve may be quickly and easily attached to or separated from the face piece.

Although the exhalation valve has been described as being attached to the face piece 1 it is to be understood that the said valve may be attached to the filter means 4, in which instance the face piece 1 would be provided with an opening with which the valve may be aligned. In the latter instance the valve would automatically be replaced when a new filter is placed in the face piece.

To prevent deterioration of the filter means 4 due to moisture the back surface of said filter means may be sprayed with latex, lacquer or metal particles to provide a protective surface coating against moisture in the exhaled air. These surfaces will also stiffen the filter means and tend to cause the said means to retain the shape to which it is formed.

It is also to be understood that the said exhalation valve on which the flat valve rests may be curved if desired.

In the form of the invention, shown in Figs. XIII and XIV, the respirator comprises a face contacting rim-like member 43 having a flange-like portion 46 shaped to overlie a similar flange-like continuous edge portion 46b of the cup-like filter member 44 and secured thereto as by a layer of adhesive, cement or other desirable means. The most desirable adhesive is one of the latex type which maintains a positive seal between the continuous flange-like edge portion 46b and the portion 46 of the face engaging portion. The face engaging member is preferably formed of resilient material having the characteristics of rubber and curls inwardly, as illustrated at 46d, so as to have a cushion-like side surface seal contact with the face with the inturned portion 46d being free to adjust itself to the contours of the face. The main cup-like portion of the filter is formed of corrugated material, such as felt, micro-porous rubber, paper or other filtering means.

Internally of the respirator there is provided a wire reinforcing and adjusting member 46a preferably formed of a single continuous wire bent to provide attaching loop portions 48' which are secured at the opposite sides of the respirator and to the face contacting portion 43 by rivets or the like 47. The wire member 46a comprises preferably two looped portions 48 each of which extends from its connection rivets 47 about and closely adjacent the inner face of the filter means in a line following one of the folds as at 49. It is to be understood that although the loops 48 are each shown as lying substantially completely in a single horizontal plane, they may be angled or tilted to engage any desired portion of the inner surface of the respirator.

In the construction as shown in Fig. XIV, the loops 48 are joined by extensions 49a, which are so formed and adjusted as to substantially meet end to end and be joined by a slip over member 51, which may be rubber, metal, or other suitable material and of such a dimension and nature as to be capable of frictional or clamping contact with the extensions 49a so as to retain its assembled position. The wire member is looped about the rivets 47 and continued in the extensions 49a thus providing a brace which supports the loops 48 and thereby the body of the respirator. This structure prevents turning of the wire member about the rivets 47 as pivots and acts as a reinforcement for the side walls 43 of the respirator. This reinforcement is aided by a plate member 50 which preferably lies on the outer surface of the edge 43, but may be inside if desired. This plate is attached by and joins the rivets 47.

The wire member serves as an anchor member for the headband 21, so that strain or working of the headband does not disturb the seal of the edge of the respirator to the face, as is sometimes the case when a respirator of this type is formed without the wire support. An extension is formed, as shown at 58, Fig. XVI, on one of the rivets, to provide a post for the attachment of the headband hook 59.

It is to be understood that the member 46a may be formed of metal or other suitable material which is sufficiently rigid to hold its adjusted shape and yet be deformable to the contours of an individual face. If desired, the member 46a may consist of a greater or less number of the loops 48, according to the particular uses to which the respirator is to be put. It may need to be more or less rigid, or have intimate support over more or less of its area, according to its purpose and use. The hook 59 may be attached to either of the rivets by forming them of a sufficient length, or it may be attached to both by forming suitable connection portions on the hook 59. The hook 59 may, if desired, be attached to the plate 50 or to any other part of the respirator where suitable connection may be made or provided for.

In the form of the invention as shown in Figs. XIII and XIV, the exhalation valve 52 on which the resilient valve 53 rests is curved.

In the form of the invention shown in Figs. XV and XVI, the respirator is formed by taking a cone shaped member 54 of felt or other filtering material as shown in dotted lines in Fig. XV, and by folding the same, form the corrugated filter member of the shape shown in Fig. XV. This construction may if desired, have a support member similar to 46a in Fig. XIV and formed to the inner contours of the corrugated filter member, or in simple loops, as desired. In some cases the support member may be dispensed with and connection portions for the headband may be provided in any one of the forms shown, or merely in the form of a post or hook embedded in the respirator, preferably adjacent the edge. The plate 50 may be used or discarded, as desired according to the purpose of the respirator.

Fig. XVI illustrates the cross section of the respirator of Fig. XV in corrugated form.

In the forms shown in Figs. XIII, XIV, XV and XVI, there is no covering over the filter members such as is shown in the other forms, where the covering serves to hold the filter means in shape. In the forms shown in Figures XIII and XIV the reinforcement and adjustment member 46a holds the filter unit in shape and the cover may be dispensed with, if desired.

In the form shown in Figs. XV and XVI the corrugations of the filter itself may serve the purpose of the cover. In this form the plate members 50 are secured to the sides of the face contacting portion 43 by rivets 57 or the like, to stiffen the face contacting portions, and one or both the rivets 57 are provided with extensions for attaching the headband to retain the respirator on the head.

Fig. XVII illustrates a modification in which the corrugations of the respirator run vertically. In this structure, the loops of the support member may run vertically or horizontally or both, as desired, with suitable bendings and anchors along the lines of those shown in Fig. XIV.

A modified structure is shown in Fig. XVIII in which the edge portion 43 is formed to extend underneath the chin of the wearer as shown at 59. This construction readily permits the wearer to talk or move the jaw without disturbing the seal of the edge portion 43 to the face and is different from the construction shown in Fig. XIV that in said construction the edge portion 43 rests on the chin of the wearer directly beneath and adjacent the lower lip. These positions may readily be established by reference to the dotted outlines of portions of the face as illustrated at 60 in Fig. XVIII and 61 in Fig. XIV. It will be noted that the construction of Fig. XIV rests above the chin and that of Fig. XVIII rests below.

It is to be understood that in all these various modifications the same valve exhalation means may be used if desired and that the construction embodying the edge portion 43 adapted to engage the face of the wearer and the body portion of the respirator attached thereto, may also be utilized in any of the modifications.

In Fig. XVIII there is shown an inhalation valve 62 in place of the customary exhalation valve shown in the other figures. It consists of a valve seat 63 and a flap member 64 similar to that used in the exhalation valves of the other constructions but reversed so as to permit inhalation and prohibit exhalation therethrough. If desired a suitable filter member 65 may be provided over the mouth of this inhalation valve and this filter member may be of the same material as the body 66 of the respirator or it may be of any other suitable filtering material. It is to be understood that this filtering material overlying the inhalation valve of the structure of Fig. XVIII may or may not be used as desired.

The purpose of the construction shown in Fig. XVIII is to provide a respirator which will be useful in keeping germs of exhalation under control and one particular use for such a respirator would be in the medical profession, for instance, a surgeon might wear such a respirator while operating and thus be permitted to inhale very readily and exhale without fear of contaminating an open wound. In some cases it might be desirable to have greater inhalation protection than can be afforded by the filter member 65, which is necessarily limited due to its small size. In such a case the inhalation valve may be dispensed with and the wearer may both inhale and exhale through the main body portion 66 of the respirator thus preventing germs from entering or leaving the mask.

If desired the material of the main body portion of the respirator or the entire respirator may be treated with a disinfectant to aid in destroying whatever germs are deposited on the respirator. Thus a filter material having disinfectant therein may be used in this respirator. It is to be understood that the valve seat 63 of the valve 62 may be substantially flat or cupped to the desired degree in a manner similar to that disclosed in connection with the exhalation valves of the other structures of this invention. The filter member 65 may be held in alignment with the valve member 62 by a support 67 which may be screwed, soldered or otherwise suitably connected in overlying relation with the inhalation valve 62, as by rivets 68.

Fig. XIX is a cross section of a respirator of the type shown in Fig. XVIII as if it were taken on line XIX—XIX of Fig. XVIII except that it shows a stockinet member 69 which is so woven as to be stretchable and elastic and has been stretched so as to fit over an entire respirator such as that shown in Fig. XVIII and thereafter allowed to clamp itself on the respirator as shown in Fig. XIX by its resilience and tendency to return to its initial set. This material may be formed of wool or other suitable weavable material so that a cloth like member after the fashion of a stocking cap may be formed which may be stretched over the respirator, leaving, if desired, an opening for the inhalation or exhalation valves. This stockinet member provides good protection to the respirator against dirt, grease, handling etc. It also provides a covering over the edge portion 43 of the respirator to make a more comfortable contact therewith against the face of the wearer and provides a secondary filter of relatively high porosity for the filtration or the retention of larger dust particles, thereby increasing the respiration efficiency through a decreased blocking rate and possibly greater dust retention. Such a stockinet member would prolong the useful life of the respirator, make it more comfortable and make it possible to keep the respirator more attractive by regular replacement thereon of a clean stockinet member.

It is to be understood that if desired a covering or protection member similar to 62 of Fig. XVIII may be used on the other respirators shown herein to provide means for protecting the valve member. This means may have filter means like 65 of Fig. XVIII or it may merely be a perforated metal plate. The protective means may be attached in overlying relation or at least in such relation as to form an air passage with the valve member by means such as shown or described in connection with Fig. XVIII or it may be attached in any other suitable manner.

It is also to be understood that in the construction shown in Fig. XV the filter member may be folded anywhere in the range between the outline indicated by 54 and the outline shown in full lines, the particular position being dependent only on the particular requirements for the respirator. Thus the folds 70 and the filter member 71 will be of greater or less dimension as desired. The wire support, as used with this construction may be varied according to the variation of the folds of the filter member.

It is particularly pointed out that in the construction illustrated in Fig. XIV the rivets 45 which secure the valve member to the respirator extend through a lip 45a formed adjacent the bottom of the filter 44 which is integral with the face engaging portion 43 and formed of similar resilient material such as rubber or the like. The rivets also extend through the corrugated filter member and when headed over seal the member 52 supporting the valve 53 with the respirator so that there will be no danger of leakage about the contour of the member 52. The portion of the filter 44 in which the opening is formed to receive the valve member 52 may be provided with a coating of adhesive prior to the heading of the rivets 45 so as to seal the filter about the member 52 and with the lip 45a. In the construction illustrated in Fig. IV it is to be noted that the member 52 supporting the resilient valve member 53 is cupped inwardly slightly so as to cause the tendency of the valve member to return to its initial set to more intimately engage the cupped face of the member 52 and provide a more positive function of valve so as to prevent accidental leakage of air through the exhalation openings formed in said member 52, which simulate the openings 9 illustrated in Fig. III. In the construction illustrated in Fig. XVIII, the member 63 is cupped outwardly or in a direction opposite to the cupping of the member 52.

From the foregoing description it will be seen that simple, efficient and economical means and method have been provided for accompanying all of the objects and advantages of the invention particularly that of providing a relatively light and inexpensive respirator adapted for general use in protecting the wearer against dust particles such as cement dust, household dust, or bacteria and which is adapted for use by flour and grain mill workers, individuals exposed to pollen, and doctors and nurses.

Having described my invention I claim:

1. In a device of the character described, a face piece shaped to fit about the nostrils and mouth of the wearer and having its entire edge portion formed of relatively thin resilient material curled inwardly entirely throughout said edge portion to form a continuous inwardly rolled lip with a free edge, a cup-like filter member having the major portion of the wall thereof arranged in folds to increase its area of filtration and having a relatively flat wall portion adjacent the free edge thereof adhesively secured in side surface relation with the inner wall of the face piece adjacent the rolled lip with said edge portion of the filter so positioned relative to said rolled edge that pressure exerted on said edge through engagement with the face will cause said edge to roll in a direction to overlie said edge of the filter, the outer side surface of said rolled lip spaced from its free edge being adapted to contact the face of the wearer and the inherent resiliency thereof being adapted to cause said side surface to relatively intimately fit with the face throughout the edge portion of said contacting edge portion of said face piece, said face piece having an open area and said filter member secured to said face piece being adapted to span said open area so as to permit the inhalation of air through said filter when said device is in position of use on the face and an adjustable frame-like support positioned internally of said cup-like filter member having portions attached to the sides of the face piece and spaced forwardly disposed brace portions curved substantially to the adjacent contour of the filter member and adapted to lie within an adjacent fold in the wall of said filter member and a head band attachment portion carried by said frame-like support by means of which the device may be held on the face.

2. In a device of the character described a frame-like face piece of relatively thin resilient material shaped to fit about the nostrils and mouth of the wearer and comprising a relatively narrow attachment wall portion and an integral inwardly curled portion forming a continuous inwardly rolled lip with a free edge throughout the face piece and a cup-like filter member fitted to said frame-like face piece with a side surface of the relatively thin attachment wall portion with a side surface of the filter member adjacent the free edge thereof secured in sealed relation with a side surface of the attachment wall portion of the face piece, said attachment wall portion of the face piece having an integral forwardly extending perforated lip adjacent the bottom thereof overlying the lower wall of the filter member with the said lower wall having an opening in substantial alignment with the perforation in said lip and a valve member secured in said aligned opening and perforation with the adjacent edges of the aligned opening and perforation being secured in sealed relation with each other and in sealed relation with the valve member, said inwardly rolled lip having a portion of its side surface spaced from its free edge adapted to contact the face of the wearer when in position of use on the face with the inherent resiliency thereof causing said side surface, under slight pressure of contact, to substantially intimately and yieldingly fit the face throughout the extent of said edge portion with said free edge of the inturned lip being adapted to roll inwardly under the pressure of the contact with the face.

3. In a device of the character described, a frame-like face piece of relatively thin sheet-like resilient material shaped to fit about the nostrils and mouth of the wearer and comprising a relatively narrow attachment wall portion extending in a forward direction when the device is in position of use on the face of the wearer and an integral portion curled inwardly in a sidewise direction to form a rolled lip with an inner free edge portion extending continuously throughout said face piece, said face piece being hollow inwardly of said rolled lip to permit free flexing of the inner free edge of the lip and a cup-like member of relatively thin filtering material mounted in said frame-like face piece with its side surface adjacent its inner free edge adhesively secured in sealed relation with the inner side surface of the relatively narrow attachment wall with the inner free edge of the lip, under pressing contact pressure with the face, being adapted to roll inwardly over the free edge of the filter member, said relatively narrow attachment wall of the frame-like face piece having a portion of increased width extending forwardly thereof and having an opening therein overlying the lower wall of the filter member and said lower wall of the filter member having an opening therein aligned with the opening in the forwardly extending portion and a valve member having a peripheral flange secured in alignment with said opening with the contour of the openings in the forwardly extending portion of the frame-like face piece member and the filter member secured in sealed relation with said flange portion.

4. In a device of the character described, a face piece shaped to fit about the nostrils and mouth of the wearer and having an edge portion of relatively thin resilient material rolled inwardly on itself to form an inturned lip with a free inner edge, a cup-like filter member, of a shape to overlie the nose and mouth of the wearer, connected in sealed relation with said face piece adjacent the free edge of said filter member and adjustable brace means attached to said face piece and having portions shaped to engage the wall of and to maintain said filter member in said cup-like shape, said brace means comprising a pair of spaced loop portions joined by a connection to the sides of the face piece with said connection having a head band attachment, and said lip having a portion of its outer side surface spaced from its free inner edge for contacting the face of the wearer and, through its inherent resiliency, substantially intimately fitting the face, and said face piece and filter member being so formed and assembled as to permit the inhalation of air through said filter when said device is in position of use on the face of the wearer.

5. In a device of the character described a frame-like face piece of relatively thin sheet-like resilient material shaped to fit about the nostrils and mouth of the wearer and comprising a relatively narrow attachment wall portion extending in a forward direction when the device is in position of use on the face of the wearer and an integral portion curled inwardly in a sidewise direction to form a rolled lip with an inner free edge portion, said face piece being hollow inwardly of said rolled lip to permit free flexing of the inner free edge of the lip and a cup-like member of relatively thin filtering material mounted in said frame-like face piece with its side surface adjacent its inner edge secured in sealed relation with the inner side surface of the relatively narrow attachment wall with the inner edge of the lip, under pressing contact pressure with the face, being adapted to roll inwardly over the inner edge of the filter member, said relatively narrow attachment wall of the frame-like face piece having a portion of increased width extending forwardly thereof and having an opening therein overlying the lower wall of the filter member and said lower wall of the filter member having an opening therein aligned with the opening in the forwardly extending portion and a valve member, secured in said aligned openings with the adjacent edges of the aligned openings being secured in sealed relation with the valve member.

6. In a device of the character described, a face piece shaped to fit over the nostrils and mouth of a wearer and adjacent the side thereof toward the face having a portion of relatively thin resilient material curled inwardly to form a continuous inwardly rolled lip with a free edge, a cup-like filter member fitted in said face piece with a side surface thereof adjacent its inner edge secured in side surface relation with the inner wall of the relatively thin resilient material adjacent the inwardly rolled lip with the inner edge portion of said filter so positioned relative to said rolled edge that pressure exerted on said edge through engagement with the face of the wearer will cause said edge to roll in a direction to overlie said inner edge of the filter, the outer side surface of said rolled lip spaced from its free edge being adapted to contact the face of the wearer and the inherent resiliency thereof being adapted to cause said side surface to relatively intimately fit with the face throughout said contacting edge portion, said filter member having an opening therein and said face piece having a vent communicating with said opening and a valve member secured in alignment with said opening in communicating relation with the vent in said face piece with said valve member being secured in sealed relation with said filter member, said face piece having an opening therein independently of said vent spanned by the filter member and which will permit inhalation of air through said filter member.

WILLIAM H. LEHMBERG.